United States Patent
Meltzer et al.

(10) Patent No.: US 8,802,770 B2
(45) Date of Patent: *Aug. 12, 2014

(54) HYDROPHOBIC THERMOPLASTIC POLYURETHANE

(75) Inventors: Donald A. Meltzer, Akron, OH (US); Jacques P. E. J. Horrion, Tilff (BE)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 1209 days.

This patent is subject to a terminal disclaimer.

(21) Appl. No.: 12/356,557

(22) Filed: Jan. 21, 2009

(65) Prior Publication Data

US 2009/0192262 A1    Jul. 30, 2009

Related U.S. Application Data

(60) Provisional application No. 61/023,144, filed on Jan. 24, 2008.

(51) Int. Cl.
| | | |
|---|---|---|
| *C08L 75/00* | (2006.01) | |
| *C08G 18/28* | (2006.01) | |
| *C08G 18/08* | (2006.01) | |
| *C08G 18/00* | (2006.01) | |
| *C08G 18/81* | (2006.01) | |
| *C08G 18/16* | (2006.01) | |
| *C08G 18/18* | (2006.01) | |
| *C08G 18/20* | (2006.01) | |
| *C08G 18/24* | (2006.01) | |
| *C08G 18/10* | (2006.01) | |
| *C08G 18/32* | (2006.01) | |
| *C08G 18/30* | (2006.01) | |
| *C08G 18/70* | (2006.01) | |
| *C08G 18/67* | (2006.01) | |
| *C08G 18/77* | (2006.01) | |
| *C08G 18/71* | (2006.01) | |
| *C08L 91/00* | (2006.01) | |

(52) U.S. Cl.
USPC ........... 524/590; 524/589; 528/44; 528/45; 528/48; 528/49; 528/50; 528/51; 528/52; 528/53; 528/54; 528/59; 528/60; 528/61; 528/62; 528/63; 528/64; 528/65; 528/66; 528/67; 528/68; 528/69; 528/70; 528/71; 528/72; 528/73; 528/74.5; 528/75; 528/76; 528/77; 528/78; 528/79; 528/80; 528/81; 528/82; 528/83; 528/84; 528/85

(58) Field of Classification Search
USPC ........... 528/44, 45, 48, 49, 50, 51, 52, 53, 54, 528/59, 60, 61, 62, 63, 64, 65, 66, 67, 68, 528/69, 70, 71, 72, 73, 74, 74.5, 75, 76, 77, 528/78, 79, 80, 81, 82, 83, 84, 85; 524/589, 524/590

See application file for complete search history.

(56) References Cited

U.S. PATENT DOCUMENTS

| | | | | |
|---|---|---|---|---|
| 3,312,666 | A * | 4/1967 | Weinbrenner et al. | ........ 264/140 |
| 4,223,112 | A | 9/1980 | Hedrick et al. | |
| 4,332,920 | A | 6/1982 | Foy et al. | |
| 4,871,792 | A | 10/1989 | Lucke | |
| 5,075,407 | A * | 12/1991 | Cody et al. | ........ 528/71 |
| 5,169,561 | A * | 12/1992 | Gentle et al. | ........ 516/119 |
| 5,959,059 | A | 9/1999 | Vedula et al. | |
| 5,981,010 | A | 11/1999 | Terry et al. | |
| 6,054,533 | A | 4/2000 | Farkas et al. | |
| 6,521,680 | B1 | 2/2003 | Durot et al. | |
| 2003/0137078 | A1 | 7/2003 | Saito et al. | |
| 2003/0226446 | A1 * | 12/2003 | Simmons | ........ 96/4 |
| 2005/0101210 | A1 | 5/2005 | Bindschedler et al. | |
| 2010/0266799 | A1 * | 10/2010 | Koonce et al. | ........ 428/36.9 |

FOREIGN PATENT DOCUMENTS

| | | | |
|---|---|---|---|
| DE | 19745700 | A1 | 4/1999 |
| EP | 0942044 | A1 | 9/1999 |
| EP | 1127915 | A1 | 8/2001 |
| JP | 1193352 | A | 8/1989 |
| JP | 8319416 | A | 12/1996 |
| JP | 11189780 | A | 7/1999 |
| JP | 10-2004-0066524 | A | 7/2004 |

* cited by examiner

Primary Examiner — Patrick Ryan
Assistant Examiner — Aaron Greso
(74) *Attorney, Agent, or Firm* — Thoburn T. Dunlap

(57) ABSTRACT

The present invention discloses a semicrystalline, thermoplastic polyurethane which is comprised of the reaction product of (1) a hydrophobic polyol, (2) a polyisocyanate, and (3) a linear chain extender containing 5 carbon atoms or 7 to 12 carbon atoms; wherein the hydrophobic polyol has a number average molecular weight which is within the range of about 1,000 to about 4,000; wherein the semicrystalline, thermoplastic polyurethane has a weight average molecular weight which is within the range of 50,000 to 1,000,000; and wherein the semicrystalline, thermoplastic polyurethane has a melting point which is within the range of 80° C. to 150° C. This hydrophobic thermoplastic polyurethane offers a unique array of characteristics that are highly desirable for utilization in manufacturing a variety of products. For instance, it can be used in overmolding soft grips onto consumer products, in adhesives, and in protective coatings.

17 Claims, No Drawings

HYDROPHOBIC THERMOPLASTIC POLYURETHANE

RELATED U.S. APPLICATION DATA

This application claims priority from U.S. Provisional Application Ser. No. 61/023,144 filed on Jan. 24, 2008.

FIELD OF THE INVENTION

The present invention relates to a soft, hydrophobic, semi-crystalline, thermoplastic polyurethane having a melting point which is within the range of about 80° C. to about 150° C. and exhibit an uncharacteristically low specific gravity, i.e., less than 1.1 or even less than 1.0. This hydrophobic thermoplastic polyurethane offers a unique array of characteristics that are highly desirable for utilization in manufacturing a variety of products. For instance, it can be used in overmolding soft grips onto consumer products, in adhesives, in protective coatings, and as a modifier for polymeric hydrocarbons, such as polyolefins, or as a compatibilizer for polyolefin/TPU blends.

BACKGROUND OF THE INVENTION

TPU (thermoplastic polyurethane) polymers are typically made by reacting (1) a hydroxyl terminated polyether or hydroxyl terminated polyester, (2) a chain extender, and (3) an isocyanate compound. Various types of compounds for each of the three reactants are disclosed in the literature. The TPU polymers made from these three reactants find use in various fields where products are made by melt processing the TPU and forming it into various shapes to produce desired articles by processes such as extrusion and molding. Important uses for TPU include manufacturing shoe soles, hoses, cable jacketing, coated fabrics such as conveyor belts, sewer liners and printing blankets, protective coatings, adhesives and melt spun elastic fibers.

TPUs are segmented polymers having soft segments and hard segments. This feature accounts for their excellent elastic properties. The soft segments are derived from the hydroxyl terminated polyether or polyester and the hard segments are derived from the isocyanate and the chain extender. The chain extender is typically one of a variety of glycols, such as 1,4-butane glycol.

U.S. Pat. No. 5,959,059 discloses a TPU made from a hydroxyl terminated polyether, a glycol chain extender, and a diisocyanate. This TPU is described as being useful for making fibers, golf ball cores, recreational wheels, and other uses.

In numerous applications, it would be desirable for the TPU to exhibit high tensile strength and a high elongation at break coupled with a melting point of less than about 175° C. In many of these applications, it would also be desirable for the TPU to be hydrophobic, to be capable of swelling in mineral oil, and to exhibit a low level of tensile set. However, soft TPUs having these combinations of physical characteristics have proven to be elusive. This is because TPUs made with hydrophobic polyols and traditional chain extenders, such as butane diol (BDO) and hexane diol (HDO), typically melt at exceptionally high temperatures that are not suitable in the applications being sought.

Plastic handles of various shapes and sizes are found on many household items. Such household items include toothbrushes, shaving razors, hairbrushes, pens, tools, kitchen appliances and kitchen utensils. These household items have a variety of functions, but in most cases, it is desirable for the user to grip the handle of these items firmly, so that it does not fall out of the user's hand. In other cases, such as with a knife, it is desirable for the handle to be gripped with even more firmness so that leverage can be applied.

Because the handles of household items are normally made with a hard plastic, the simplest tasks can become problematic for some people, such as the elderly and those suffering from arthritis in the joints of their hands. This problem is compounded in cases where the handle of the article, such as a toothbrush or shaving razor, come into contact with water making it more slippery. For instance, when a toothbrush or razor is wet, it is more difficult to grip and can slip out of the user's hands. Other items such as tools and kitchen utensils can have handles that are difficult to hold or uncomfortable to grip because of the hardness of the plastic material. For persons suffering from arthritis, carpal tunnel syndrome or other hand injuries or infirmities, using basic household objects can become difficult or even impossible.

Most people would prefer to hold objects with a softer handle that is more soothing to the touch and easier to grip. Accordingly, a need exists for a soft grip handles that can be grasped firmly and comfortably and which requires minimum strength and dexterity to grip and maneuver. There is, accordingly, a growing demand for a wide variety of articles that are soft and soothing to touch. It is, of course, also important for these articles to have the strength, durability, and rigidity needed in the applications where the article is used. This can be accomplished by overmolding a soft thermoplastic composition onto a hard thermoplastic substrate. However, there is a need for a soft thermoplastic elastomer composition that can be overmolded onto a hard thermoplastic resin substrate wherein the soft thermoplastic composition has lower hardness, good oil resistance and low compression set. There is currently a need for a thermoplastic composition that has superior feel and comfort as characterized by a lower modulus to that which is obtained by using syndiotactic polypropylene copolymer.

SUMMARY OF THE INVENTION

The soft, hydrophobic, semicrystalline, thermoplastic polyurethane of this invention offers a unique array of chemical and physical characteristics that are highly desirable for a variety of applications in manufacturing consumer and industrial products. More specifically, the TPUs of this invention exhibit high tensile strength and high elongation at break coupled with a melting point of less than about 175° C. The TPU of this invention is also hydrophobic, has a density of less than 1.1, offers low tensile set, and can be swollen in mineral oil. The TPU of this invention also typically exhibits a glass transition temperature of less than about 0° C. This unique combination of properties makes the TPU of this invention beneficial for utilization in manufacturing adhesives, protective coatings, printing blankets, and overmolded grips for various consumer products.

The present invention more specifically discloses a semicrystalline, thermoplastic polyurethane which is comprised of the reaction product of (1) a hydrophobic polyol, (2) a polyisocyanate, and (3) a linear chain extender containing 5 carbon atoms or 7 to 12 carbon; wherein the hydrophobic polyol has a number average molecular weight which is within the range of about 1,000 to about 4,000; wherein the semicrystalline, thermoplastic polyurethane has a weight average molecular weight which is within the range of 50,000 to 1,000,000; and wherein the semicrystalline, thermoplastic polyurethane has a melting point which is within the range of 80° C. to 150° C.

The subject invention further reveals a thermoplastic polyurethane composition which is comprised of (I) a semicrystalline, thermoplastic polyurethane which is comprised of the reaction product of (1) a hydrophobic polyol, (2) a polyisocyanate, and (3) a linear chain extender containing 5 carbon atoms or 7 to 12 carbon; wherein the hydrophobic polyol has a number average molecular weight which is within the range of about 1,000 to about 4,000; wherein the semicrystalline, thermoplastic polyurethane has a weight average molecular weight which is within the range of 50,000 to 1,000,000; and wherein the semicrystalline, thermoplastic polyurethane has a melting point which is within the range of 80° C. to 150° C. and (II) from about 1 weight percent to about 100 weight percent mineral oil, based upon the weight of the semicrystalline, thermoplastic polyurethane.

The present invention also discloses an article of manufacture that is comprised of a soft thermoplastic polyurethane overmolded onto a hard substrate wherein the soft thermoplastic polyurethane is comprised of the reaction product of (1) a hydrophobic polyol, (2) a polyisocyanate, and (3) a linear chain extender containing 5 carbon atoms or 7 to 12 carbon; wherein the hydrophobic polyol has a number average molecular weight which is within the range of about 1,000 to about 4,000; wherein the soft thermoplastic polyurethane has a weight average molecular weight which is within the range of 50,000 to 1,000,000; and wherein the soft thermoplastic polyurethane has a melting point which is within the range of 80° C. to 150° C. It is frequently desirable for such soft thermoplastic polyurethanes to be further comprised of a mineral oil to make the composition even softer and to reduce the total cost of the material. In such cases, the mineral oil will typically be present in an amount which is within the range of 1 weight percent to 100 weight percent, based upon the weight of the thermoplastic polyurethane.

The subject invention further reveals a compatibilized blend of a thermoplastic elastomer and a polyolefin, comprising: from about 5 to about 95 percent by weight of the thermoplastic elastomer and from about 95 to about 5 percent by weight of the polyolefin based upon the total weight of said thermoplastic elastomer and said polyolefin in the blend, and an effective amount of a compatibilizing agent to compatibilize said thermoplastic elastomer and said polyolefin, said compatibilizing agent being a semicrystalline, thermoplastic polyurethane which is comprised of the reaction product of (1) a hydrophobic polyol, (2) a polyisocyanate, and (3) a linear chain extender containing 5 carbon atoms or 7 to 12 carbon atoms; wherein the hydrophobic polyol has a number average molecular weight which is within the range of about 1,000 to about 4,000; wherein the semicrystalline, thermoplastic polyurethane has a weight average molecular weight which is within the range of 50,000 to 1,000,000; and wherein the semicrystalline, thermoplastic polyurethane has a melting point which is within the range of 80° C. to 150° C. The effective amount of said compatibilizing agent in such blends will typically be within the range of about 0.25 to about 15 parts by weight per 100 parts by total weight of said thermoplastic elastomer and said polyolefin in the blend.

DETAILED DESCRIPTION OF THE INVENTION

The thermoplastic polyurethane of this invention is the reaction product of (1) a hydrophobic polyol, (2) a polyisocyanate, and (3) a linear chain extender containing 5 carbon atoms or 7 to 12 carbon atoms. The technique under which these reactants are polymerized to synthesize the thermoplastic polyurethane is conducted utilizing conventional equipment, catalysts, and procedures. However, the polymerization is conducted in a manner that will result in attaining a weight average molecular weight which is within the range of about 50,000 to about 500,000. It is also, of course, conducted utilizing a hydrophobic polyol and a linear chain extender containing 5 carbon atoms or 7 to 12 carbon atoms.

The hydrophobic polyol used in synthesizing the TPU of this invention can be a diol of a conjugated diolefin monomer, a polyisobutylene diol, a polyester polyol prepared from fatty diols and/or fatty diacids, or mixtures thereof. For instance, the hydrophobic polyol can be prepared from dimer fatty alcohols and/or dimer fatty acids. The diols of conjugated olefin monomers that can be used include hydrogenated polybutadienediols, and hydrogenated polyisoprene diol. Hydrogenated polybutadiene polyols are sold by Mitsubishi Chemical Corporation under the trade name POLYTAIL and Kraton polyols sold by Kraton Polymers of Houston, Tex.

Dimeric acid polyester polyols containing from about 18 to about 44 carbon atoms are well suited for utilization in the practice of this invention. Dimer acids (and esters thereof) are a well known commercially available class of dicarboxylic acids (or esters). They are normally prepared by dimerising unsaturated long chain aliphatic monocarboxylic acids, usually of 13 to 22 carbon atoms, or their esters (alkyl esters). The dimerisation is thought (although we should not be bound by this theory) to proceed by possible mechanisms which includes Diels Alder, free radical, and carbonium ion mechanisms. The dimer acid material will usually contain 26 to 44 carbon atoms. Particularly, examples include dimer acids (or esters) derived from $C_{18}$ and $C_{22}$ unsaturated monocarboxylic acids (or esters) which will yield, respectively, $C_{36}$ and $C_{44}$ dimer acids (or esters). Dimer acids derived from $C_{18}$ unsaturated acids, which include acids such as linoleic and linolenic are particularly well known (yielding $C_{36}$ dimer acids). For example, DELTA 9, 11 and DELTA 9, 12 linoleic acids can dimerise to a cyclic unsaturated structure (although this is only one possible structure; other structures, including acyclic structures are also possible). The dimer acid products will normally also contain a proportion of trimer acids ($C_{54}$ acids when using $C_{18}$ starting acids), possibly even higher oligomers and also small amounts of the monomer acids. Several different grades of dimer acids are available from commercial sources and these differ from each other primarily in the amount of monobasic and trimer acid fractions and the degree of unsaturation. Priplast™ polyester polyols are branched $C_{36}$ dimerized fatty acids which are particularly useful as the hydrophobic polyol in the practice of this invention. Priplast™ polyester polyols are commercially available from Uniqema of Gouda, Netherlands. The hydrophobic polyol used in synthesizing the TPU of this invention will typically have a number average molecular weight which is within the range of about 1,500 to about 4,000 and will preferably have a number average molecular weight which is within the range of about 2,000 to about 3,000.

The linear chain extender used in making the thermoplastic polyurethane of this invention will typically be of the structural formula:

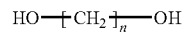

$$HO-(CH_2)_n-OH$$

wherein n represents the integer 5 or an integer from 7 to 12. Accordingly, the linear chain extender will typically be selected from the group consisting of 1,5-pentane diol, 1,7-heptane diol, 1,8-octane diol, 1,9-nonane diol, 1,10-decane diol, 1,11-undecane diol, and 1,12-dodecane diol. The most preferred chain extender is 1,12-dodecane diol with it being preferred for the chain extender to consist entirely of 1,12-dodecane diol. However, it should be appreciated that various mixtures of diols can be utilized as the chain extender in the practice of this invention.

The polyisocyanate used in synthesizing the thermoplastic polyurethane is preferably a diisocyanate. While aliphatic diisocyanates can be utilized, aromatic diisocyanates are highly preferred. Moreover, the use of multifunctional isocyanate compounds, i.e., triisocyanates, etc., which cause crosslinking, are generally avoided and thus the amount used, if any, is generally less than 4 mole percent and preferably less than 2 mole percent based upon the total moles of all of the various isocyanates used. Suitable diisocyanates include aromatic diisocyanates such as: 4,4'-methylene bis-(phenyl isocyanate) (MDI); m-xylene diisocyanate (XDI), phenylene-1-4-diisocyanate, naphthalene-1,5-diisocyanate, diphenylmethane-3,3'-dimethoxy-4,4'-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. Dimers and trimers of the above diisocyanates may also be used as well as a blend of two or more diisocyanates may be used.

The polyisocyanate used in this invention may be in the form of a low molecular weight polymer or oligomer which is end capped with an isocyanate. For example, the hydroxyl terminated polyether intermediate described above may be reacted with an isocyanate-containing compound to create a low molecular weight polymer end capped with isocyanate. In the TPU art, such materials are normally referred to as pre-polymers. Such pre-polymers normally have a number average molecular weight (Mn) which is within the range of about 500 to about 10,000.

The mole ratio of the one or more diisocyanates is generally from about 0.95 to about 1.05, and preferably from about 0.98 to about 1.03 moles per mole of the total moles of the one or more hydrophobic polyols and the one or more chain extenders. The molar ratio of the chain extender to the polyol will typically be within the range of about 0.3:1 to 10:1 and will more typically be within the range of about 0.4:1 to 5:1. The molar ratio of the chain extender to the polyol will preferably be within the range of about 0:5:1 to 3:1 and will more preferably be within the range of about 0.5:1 to 2:1.

The process employed to produce the TPU polymer of this invention can utilize conventional TPU manufacturing equipment. The hydrophobic polyol, the diisocyanate, and the chain extender, as noted above, are generally added together and reacted in accordance with any conventional urethane reaction method. Preferably, the TPU forming components of the present invention are melt polymerized in a suitable mixer, such as an internal mixer (a Banbury mixer), or preferably an extruder. In the preferred process, the hydrophobic polyol is blended with the glycol chain extender and added to the extruder as a blend. The diisocyanate is added separately to the extruder. Suitable processing or polymerization starting temperatures of the diisocyanate is from about 100° C. to about 200° C., and preferably from about 100° C. to about 150° C. Suitable processing or polymerization starting temperatures of the blend of the hydrophobic polyol and the aromatic chain extender is from about 100° C. to about 220° C., and preferably from about 150° C. to 200° C. Suitable mixing times in order to enable the various components to react and form the TPU polymers of the present invention are generally from about 2 to about 10 minutes, and preferably from about 3 to about 5 minutes.

The preferred process to produce the TPU of this invention is the process referred to as the one-shot polymerization process. In the one-shot polymerization process which generally occurs in situ, a simultaneous reaction occurs between three components, that is the one or more hydrophobic polyol, the chain extender, and the diisocyanate. The reaction is generally initiated at a temperature of from about 90° C. to about 200° C. Inasmuch as the reaction is exothermic, the reaction temperature generally increases to about 220° C. to 250° C. The TPU polymer will exit the reaction extruder and will typically be pelletized. The pellets of TPU are normally stored in a heated vessel to continue the reaction and to dry the TPU pellets.

It is often desirable to utilize catalysts such as stannous and other metal carboxylates as well as tertiary amines. Examples of metal carboxylates catalysts include stannous octoate, dibutyl tin dilaurate, phenyl mercuric propionate, lead octoate, iron acetylacetonate, magnesium acetylacetonate, and the like. Examples of tertiary amine catalysts include triethylene diamine, and the like. The amount of the one or more catalysts is low, generally from about 50 to about 100 parts by weight per million parts by weight of the end TPU polymer formed.

The weight average molecular weight (Mw) of the TPU polymer of the present invention range from about 50,000 to about 500,000 Daltons, preferably from about 100,000 to about 500,000 Daltons, and more preferably from about 120,000 to about 300,000 Daltons. The Mw of the TPU polymer is measured according to gel permeation chromatography (GPC) against polystyrene standard.

When a higher molecular weight TPU polymer is desired, it can be achieved by using a small amount of a cross linking agent having an average functionality greater than 2.0 to induce cross linking. The amount of cross linking agent used is preferably less than 2 mole percent of the total moles of chain extender, and more preferably less than 1 mole percent. A particularly desirable method to increase the molecular weight in the preferred TPU polymer is to replace less than 1 mole percent of the chain extender with trimethylol propane (TMP).

The cross linking is accomplished by adding a cross linking agent having an average functionality greater than 2.0 together with the hydrophobic polyol, the isocyanate compound, and chain extender in the reaction mixture to manufacture the TPU polymer. The amount of cross linking agent used in the reaction mixture to make the TPU polymer will depend on the desired molecular weight and the effectiveness of the particular cross linking agent used. Usually, less than 2.0 mole percent, and preferably less than 1.0 mole percent, based on the total moles of chain extender used in making the TPU polymer are used. Levels of cross linking agent greater than 2.0 mole percent, based on the total moles of chain extender would be difficult to melt process. Therefore, the level of cross linking agent used is from about 0.05 mole percent to about 2.0 mole percent based on the total moles of chain extender.

The cross linking agents can be any monomeric or oligomeric materials which have an average functionality of greater than 2.0 and have the ability to cross link the TPU polymer. Such materials are well known in the art of thermoset polyurethanes. Preferred cross linking agents include trimethylol propane (TMP) and pentaerythritol. Trimethylol propane has been found to particularly be a desirable cross linking agent.

The TPU polymers of the present invention can be mixed with various conventional additives or compounding agents, such as fillers, extenders, pigments, lubricants, UV absorbers, plasticizers and the like. Fillers that can be used include talc, silicates, clays, calcium carbonate, and the like. The level of conventional additives will depend on the final properties and cost of the desired end-use application, as is well known to those skilled in the art of compounding TPUs. The additives may be added during the reaction to form the TPU, but are normally added in a second compounding step.

TPU compositions that are particularly useful as overmolding compositions for making soft grips and handles for consumer products are further comprised of mineral oil. The mineral oil will typically be added to the TPU at a level which is within the range of 1 weight percent to 100 weight percent, based upon the weight of the TPU. In other words, 1 part by weight to 100 parts by weight of mineral oil will be added to 100 parts by weight of the TPU. It is typically preferred for the mineral oil to be added in an amount which is within the range of 5 weight percent to 50 weight percent, based upon the weight of the TPU. In any case, the mineral oil acts to swell the TPU making it softer. The addition of mineral oil also typically reduces the overall material cost of the TPU composition.

The TPU polymer of this invention has a melting point which is within the range of about 80° C. to about 150° C. It will typically have a melting point which is within the range of about 90° C. to about 145° C., and will more typically have a melting point which is within the range of about 110° C. to about 140° C. The melting point of the TPU polymer can be measured according to ASTM D-3417-99 using a differential scanning calorimeter (DSC). However, in the case of very soft polymers the Kofler method can be used to measure the melting point of the TPU.

The TPUs of this invention offer excellent resistance against compression set and tensile set. For instance, the TPUs of this invention typically offer a tensile set at 200% strain of less than 20%, preferably less than 15%, and most preferably less than 10% when tested at 23° C. and in accordance with ASTM D412. They also offer high tensile strengths of over 1000 psi ($6.9 \times 10^6$ Pascals) and elongations to break of greater than 500%. The TPUs of this invention will preferable have a tensile strength of greater than 1500 psi ($1.0 \times 10^7$ Pascals) and will most preferably exhibit a tensile strength of greater than 2000 psi ($1.4 \times 10^7$ Pascals).

TPU compositions of this invention have characteristics that make them particularly desirable for utilization in manufacturing overmolded consumer products. In other words, the TPU of this invention can be overmolded onto a hard substrate, such as a plastic or metal surface, to produce a soft grip or handle. The TPU of this invention offers excellent touch characteristics and low cost in such overmolding applications. It is also essentially odor-free, scratch resistant and can be colored as desired. More specifically, the TPU of this invention offers a low cost, gentle to the touch material for easy to grip handles that can by easily overmolded onto a hard thermoplastic resin or metal substrates.

The TPU of this invention can be beneficially used in making grips or handles for articles of manufacture including, but not limited to, toothbrushes, shaving razors, hairbrushes, hairdryers, paintbrushes, pens, tools (saws, hammers, screwdrivers, wrenches, pliers), kitchen appliances (handles for refrigerator doors, ovens, dishwashers, bread warmers, trash compactors), kitchen utensils (spoons, forks, knives, spatulas, shish kabob skewers, vegetable peelers, can openers, bottle openers, corkscrews, whisks, basting brushes), vacuum cleaner handles, brooms, mops, rakes, shovels, scissors, sporting equipment (fishing poles, tennis rackets, firearms, and golf clubs), and dinghy brushes.

The present invention more specifically discloses an article of manufacture that is comprised of the soft TPU of this invention which is overmolded onto a hard substrate, such as a metal or thermoplastic resin. The TPU composition utilized in such applications can beneficially be further comprised of mineral oil to reduce cost and to further soften the overmolded grip.

TPU compositions of this invention also have characteristics that make them particularly desirable for utilization as a compatibilizer for polyolefin/TPU blends. Virtually any type of TPU/polyolefin blend can be compatibilized with the TPU compositions of this invention. The thermoplastic polyurethane can typically be of any conventional type known to those skilled in the art or described in the literature. Such conventional thermoplastic polyurethanes are described in U.S. Pat. No. 6,054,533. The teachings of U.S. Pat. No. 6,054,533 are incorporated by reference herein for the purpose of describing the types of conventional thermoplastic polyurethanes and can be employed in such blends and techniques for their synthesis.

The polyolefins utilized in such compatibilized TPU/polyolefin blend are made from olefin monomers containing from 2 to about 6 carbon atoms, such as polyethylene (including high density polyethylene, low density polyethylene, linear low density polyethylene and the like), polypropylene (including atactic polypropylene, syndiotactic polypropylene, and blends of polypropylene with elastomers), polybutylene, and copolymers of such olefin monomers. The weight average molecular weight of such polyolefins is generally from about 40,000 to about 2,000,000, and preferably from about 100,000 to about 1,500,000.

The amount of the thermoplastic elastomers utilized in forming the physical blend is generally from about 5 percent to about 95 percent by weight, and preferably from about 15 to about 60 percent by weight based upon the total weight of the thermoplastic elastomer and the polyolefin. The amount of the polyolefin utilized in the blend is a complementary amount.

The amount of the compatibilizing agent of the present invention utilized to form the compatibilized blend is unexpectedly a very low level. Naturally, the optimum amount will vary depending upon the type of thermoplastic elastomers, the type of particular polyolefin, and the like. Generally, the amount of compatibilizing agent is from about 0.25 to about 15 parts by weight and desirably from about 0.5 or 0.75 to about 6 or 10 parts by weight for every 100 parts by weight of the thermoplastic elastomer and the polyolefin blend.

The polyolefin and the thermoplastic elastomer are mixed or blended in a suitable manner along with the compatibilizing agent to achieve a compatibilized blend. The mixing can utilize conventional melt processing techniques and can either be batch or continuous such as through the use of a single or a twin screw extruder. The mixing temperature is generally above the melting point of the polyolefin, the thermoplastic elastomer and the compatibilizing agent. Such temperatures are generally from about 180° C. to about 240° C. The mixing time will naturally vary depending upon the amount of components being blended together, the mixing equipment used, and the mixing temperature.

After being compatibilized, such thermoplastic polyolefin blends exhibit improved properties such as impact resistance, good tensile strength, low delamination, good tear resistance, low abrasion, and the like over noncompatibilized blends of the same two polymers as fully shown in the various examples. The compatibilized blends of the present invention can be used wherever blends having the above-noted properties are desired, as in automotive components, for example rocker panels, body side moldings, quarter panels, and the like; in electronic component packaging items; in business machines such as housing and the like; and for auxiliary devices for the electronic industry.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES 4-6 AND COMPARATIVE EXAMPLE 1-3

In this experiment a series of TPU polymers were synthesized using the same general procedure with different chain extenders. The procedure used involved heating a blend of hydrophobic polyol and chain extender, and diisocyanate separately to about 120° C. and then mixing the ingredients. The viscosity of the reaction mixture was observed to significantly increase reactions in about 1 to 5 minutes at during which time the reaction vessel was emptied and the polymerizate was allowed to slowly cool to room temperature. The chain extender employed and the ratio of chain extender to polyisocyanate used is reported in Table 1. It should be noted that Examples 1-3 are comparative example wherein 1,4-butanediol or 2-butyl, 2-ethyl-1,3-propanediol, BEPD, were used at the chain extender. In accordance with this invention the chain extender used in Examples 4-6 was 1,12-dodecane diol. Stannous octoate was used as a catalyst at a level of 50 ppm in each example.

TABLE 1

| | Example | | | | | |
|---|---|---|---|---|---|---|
| | 1 | 2 | 3 | 4 | 5 | 6 |
| Blend Weight | 183 | 185 | 190 | 180 | 188 | 194 |
| Priplast ™ 3196 polyester polyol | 174.00 | 174.00 | 174.00 | 174.00 | 174.00 | 174.00 |
| 1,4-butanediol | 9.15 | — | — | — | — | — |
| BEPD | — | 11.40 | 16.25 | — | — | — |
| 1,12-dodecanediol | — | — | — | 5.50 | 14.00 | 20.00 |
| 4,4'-methylene bis-(phenyl isocyanate) | 39.98 | 32.20 | 39.75 | 21.23 | 31.72 | 39.12 |
| % Urethane Segment | 22.02 | 20.0 | 24.3 | 13.3 | 20.8 | 25.4 |
| Chain Extender to Diisocyanate ratio | 1.753 | 1.228 | 1.751 | 0.469 | 1.195 | 1.707 |
| Melt Index (210° C./3800 g)* | 20 | | | | | |
| Melt Index (190° C./8700 g)* | | 120 | 36 | 96 | 84 | 70 |
| Melting Temperature (Tm) | 193° C. | ** | ** | 98° C. | 134° C. | 135° C. |
| Glass Transition Temperature (Tg) | −45° C. | −41° C. | −37° C. | −43° C. | −43° C. | −45° C. |
| Crystallization Temperature (Tc) | 81° C. | 44° C. | 46° C. | | 56° C. | 65° C. |
| Tensile Strength (psi) | 1170 | 198 | 880 | 1390 | 2220 | 2070 |
| Tensile Elongation | 452% | 674% | 616% | 1070% | 724% | 692% |

*MI values are reported in g/10 minutes
** The melting point was not be determined.

As can be seen from Table 1, the TPU samples made in Examples 4-6 using 1,12-dodecane diol as the chain extender had superior tensile strength as compared to the TPUs made in Examples 1-3. It should be further noted that the TPUs made in Examples 4-6 also had tensile elongations that were superior to those made in Examples 1-3. The melting points of the polymers made in Examples 4-6 were all within the range of 98° C. to 135° C. This is in contrast to the TPU made in Example 1 which had a melting point of 193° C. and to the polymers made in Examples 2 and 3 which were highly viscous, tacky materials such that it was not desirable to measure a melting point.

While certain representative embodiments and details have been shown for the purpose of illustrating the subject invention, it will be apparent to those skilled in this art that various changes and modifications can be made therein without departing from the scope of the subject invention.

What is claimed is:

1. A semicrystalline, thermoplastic polyurethane which is comprised of the reaction product of (1) a polyester hydrophobic polyol, wherein said hydrophobic polyol is made from dimer acids or esters thereof containing from 36 to 44 carbon atoms, (2) a polyisocyanate, and (3) a linear diol chain extender containing 5 carbon atoms or 7 to 12 carbon atoms; wherein the hydrophobic polyol has a number average molecular weight which is within the range of about 1,000 to about 4,000; wherein the semicrystalline, thermoplastic polyurethane has a weight average molecular weight which in within the range of 50,000 to 1,000,000; and wherein the semicrystalline, thermoplastic polyurethane has a melting point which is within the range of 80° C. to 150° C.

2. A semicrystalline, thermoplastic polyurethane as specified in claim 1 wherein the semicrystalline, thermoplastic polyurethane has a density of less than 1.1.

3. A semicrystalline, thermoplastic polyurethane as specified in claim 1 wherein the polyisocyanate is a diisocyanate.

4. A semicrystalline, thermoplastic polyurethane as specified in claim 1 wherein the polyisocyanate is aromatic diisocyanate.

5. A semicrystalline, thermoplastic polyurethane as specified in claim 4 wherein the aromatic diisocyanate is selected from the group consisting of 4,4'-methylene bis-(phenyl isocyanate), m-xylene diisocyanate, phenylene-1-4-diisocyanate, naphthalene-1,5-diisocyanate, diphenylmethane-3,3'-dimethoxy-4,4'-diisocyanate, and toluene diisocyanate.

6. A semicrystalline, thermoplastic polyurethane as specified in claim 4 wherein the aromatic diisocyanate is 4,4'-methylene bis-(phenyl isocyanate).

7. A semicrystalline, thermoplastic polyurethane as specified in claim 1 wherein the hydrophobic polyol has a number average molecular weight which is within the range of about 2,000 to about 3,000.

8. A semicrystalline, thermoplastic polyurethane as specified in claim 1 wherein the hydrophobic polyol is a branched dimerized fatty acid.

9. A semicrystalline, thermoplastic polyurethane as specified in claim 8 wherein the branched dimerized fatty acid contains from 26 to 44 carbon atoms.

10. A semicrystalline, thermoplastic polyurethane as specified in claim 8 wherein the branched dimerized fatty acid contains 36 carbon atoms.

11. A semicrystalline, thermoplastic polyurethane as specified in claim 1 wherein the linear chain extender is 1,12-dodecane diol.

12. A semicrystalline, thermoplastic polyurethane as specified in claim 1 wherein the molar ratio of the chain extender to the diisocyanate is within the range of about 0.3:1 to 10:1.

13. A semicrystalline, thermoplastic polyurethane as specified in claim 1 wherein the molar ratio of the chain extender to the diisocyanate is within the range of about 0.5:1 to 3:1.

14. A semicrystalline, thermoplastic polyurethane as specified in claim 1 wherein the molar ratio of the chain extender to the diisocyanate is within the range of about 0.5:1 to 2:1.

15. A semicrystalline, thermoplastic polyurethane as specified in claim 1 wherein the semicrystalline, thermoplastic polyurethane has a melting point which is within the range of 110° C. 140° C.

16. A semicrystalline, thermoplastic polyurethane as specified in claim 1 wherein the semicrystalline, thermoplastic polyurethane has a glass transition temperature of less than 0° C.

17. A thermoplastic polyurethane composition which is comprised of the semicrystalline, thermoplastic polyurethane specified in claim 1 and from about 1 weight percent to about 100 weight percent mineral oil, based upon the weight of the semicrystalline, thermoplastic polyurethane.

\* \* \* \* \*